United States Patent [19]

Joslow et al.

[11] 4,140,877

[45] Feb. 20, 1979

[54] MULIPLE HIGHWAY TIME DIVISION MULTIPLEXED PABX COMMUNICATION SYSTEM

[75] Inventors: David L. Joslow, Chester, Conn.; Alan Bloch, New York, N.Y.; Chansak Laoteppitaks, Orange, Conn.

[73] Assignee: TIE/communications, Inc., Stamford, Conn.

[21] Appl. No.: 788,847

[22] Filed: Apr. 19, 1977

[51] Int. Cl.$^{2}$ .................................................. H04J 3/08

[52] U.S. Cl. .......................... 179/15 AL; 179/15 AQ; 179/18 RC

[58] Field of Search ........ 179/15 AL, 15 BY, 18 FC, 179/15 AQ

[56] References Cited

U.S. PATENT DOCUMENTS

| | | | |
|---|---|---|---|
| 3,597,549 | 8/1971 | Farmer | 179/15 AL |
| 3,732,374 | 5/1973 | Rocher | 179/15 AL |
| 3,883,693 | 5/1975 | Moore | 179/15 AL |
| 3,924,077 | 12/1975 | Blakeslee | 179/15 AL |
| 3,937,892 | 2/1976 | Bloch | 179/15 AL |

*Primary Examiner*—David L. Stewart
*Attorney, Agent, or Firm*—McCormick, Paulding & Huber

[57] ABSTRACT

A communication switching system of PABX uses a number of time division multiplexed send and receive highway pairs each servicing a plurality of peripheral devices or ports providing two-way communication with the outside world by means of associated telephones, trunk line interfaces, or similar apparatus. All highway pairs are multiplexed in accordance with the same time division format and the maximum number of two-way peripheral devices serviced by each highway pair is dependent on the number of time slots of the format assigned for audio communication. Each peripheral device transmits on a given audio time slot of its send highway. Switching to establish communication paths between peripheral devices is achieved in part by receiving means in each peripheral device responsive to command signals transmitted on command time slots on the associated receive highway instructing each peripheral device on which audio time slots of its receive highway to receive. A further part of the switching is provided by a plurality of highway switches in the common equipment which, under processor control, may forward the signal appearing in any given audio time slot of a send highway to the corresponding audio time slot of any selected one or more of the receive highways, thereby allowing each peripheral device to transmit an audio message to any other peripheral device of the system. Slot shifters are provided and used in cases where a peripheral device attempts to transmit to an audio time slot of a receive highway already in use. A central processor which communicates directly only with equipment in the common control formulates the command messages sent to the peripheral devices over the receive highways, formulates instructions controlling operation of the highway switches and otherwise supervises the functioning of the system. The arrangement of the system is one whereby it may be readily made up of whatever minimum number of highways pairs is necessary to yield the number of peripheral devices or ports necessary to suit the requirements of the office, plant or other facilities in which the system is to be installed, and whereby the capacity of the system, after installation, may be easily incrementally increased by adding additional highway pairs.

10 Claims, 8 Drawing Figures

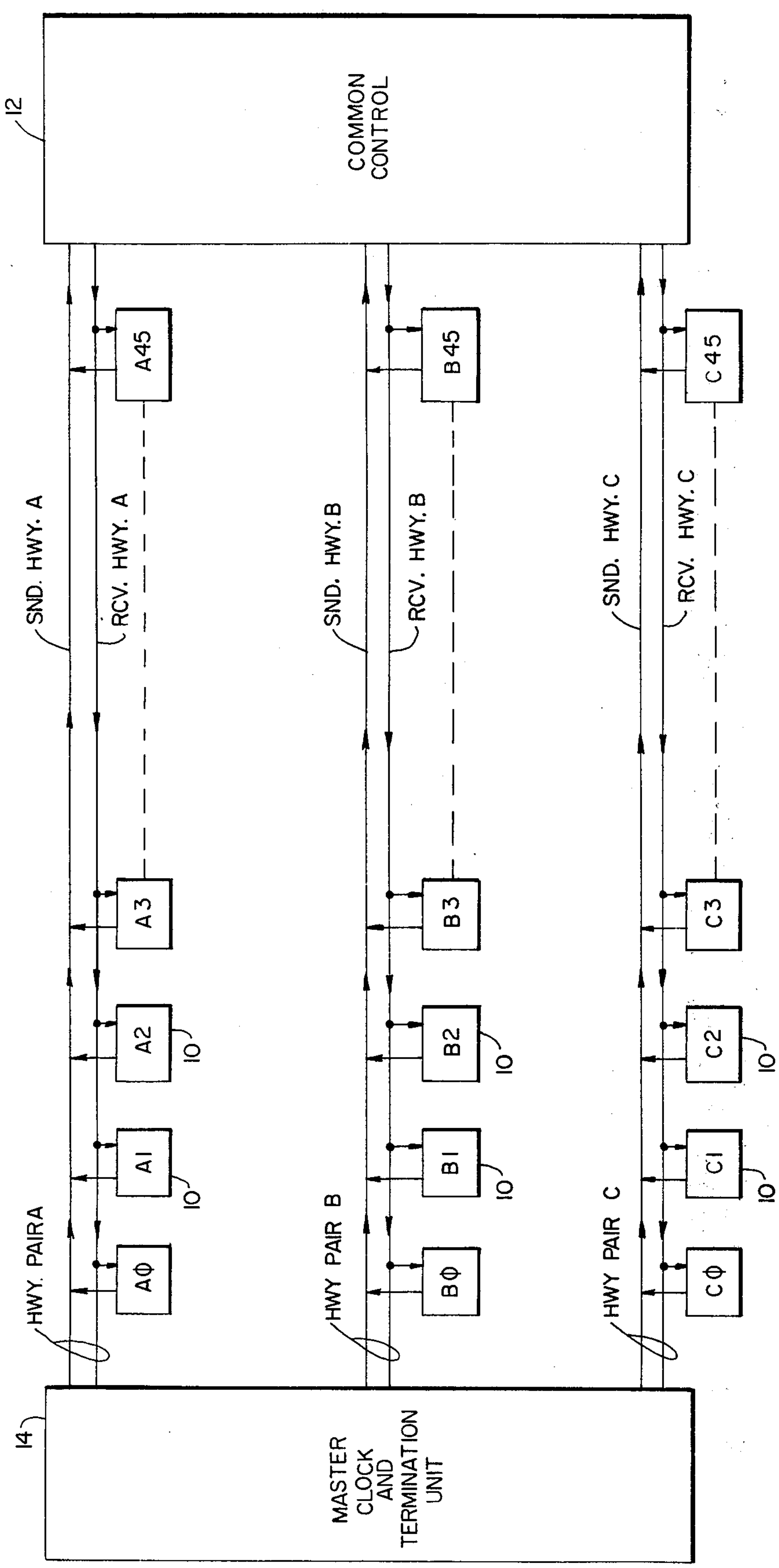
FIG. I

HWY. PAIR A
SNDA
SCLKA
RCVA
RCLKA
SND. HWY. A
RCV. HWY. A
A Φ
CONSOLE
A1
TELEPHONE
A2
TELEPHONE
A45
TRUNK
(PORTS
AΦ to A49)
CPU
MASTER CLOCK AND
TERMINATION UNIT
SCLKA
SCLKB
SCLKC
SEND
CLK
DRIVER
SYNC
PULSE
DROPPER
CLK
RCV.
END
TERM.
10
14
16
18
20
21
28
30
32
34
36
38

COMMON CONTROL
12
SYSTEM MEMORY
34
C.P.U.
32
28
FIFO BUFFER
94
MESSAGE SENDER A
MESSAGE SENDER B
MESSAGE SENDER C
88
90
92
GATING REPEATER A
40
GCLKA
GSNDA
BCLKA
BSNDA
50
54
56
48
46
SNDA
SCLKA
RCVA
RCLKA
BLOCKA
BSNDA
BCLKA
DTMF GEN A
42
TONE
STATUS REPORTER A
38
A 46 SLOT SHIFTER
A 47 SLOT SHIFTER
A 48 SLOT SHIFTER
A 49 SLOT SHIFTER
26
TONE DECODER
36

MEM. READ CONT.
SWITCH A MEMORY
SWITCH B MEMORY
LATCH
SWITCH CONTROL
HWY SWITCH A
HWY SWITCH B
OUT
CMCLK
GSNDA
GSNDB
GSNDC
SUPERVISORY TONE GENERATOR
REORDER
BUSY
RING
DIAL
RCV CLOCK DRIVER
CLOCK MIXER
RCVA

GCLKB
GSNDB
BCLKB
BSNDB
GATING REPEATER B
SNDB
SCLKB
RCVB
RCLKB
BLOCKB
DTMF GEN. B
TONE
BSNDB
BCLKB
STATUS REPORTER B
B 49 SLOT SHIFTER
B 48 SLOT SHIFTER
B 47 SLOT SHIFTER
B46 SLOT SHIFTER
TONE DECODER
GCLKC
GSNDC
BCLKC
BSNDC
GATING REPEATER C
SNDC
SCLKC
RCVC
RCLKC
BLOCKC
BSNDC
BCLKC
DTMF GEN. C
STATUS REPORTER C
C 49 SLOT SHIFTER
C 48 SLOT SHIFTER
C 47 SLOT SHIFTER
C 46 SLOT SHIFTER
40
42
46
48
50
28
38
26
36

MULIPLE HIGHWAY TIME DIVISION MULTIPLEXED PABX COMMUNICATION SYSTEM

BACKGROUND OF THE INVENTION

This invention relates to communication switching systems for selectively establishing two-way communication paths between desired ones of a set of telephone instruments, trunk line interfaces or other two-way communication peripheral devices, and deals more particularly with such a switching system of the type commonly referred to as a private automatic branch exchange (PABX) for servicing a reasonably large number of telephone instruments or other two-way communication peripheral devices, for example up to several hundred of such devices, such as those used in a given office, factory, government agency or similar business establishment.

The communication system of this invention is in many respects similar to that disclosed in copending U.S. patent application Ser. No. 665,551, filed Mar. 10, 1976. The communication system of that application is one using time division multiplexing for the transmission of signals on the communication lines and has a processor implemented common control. Further, the system disclosed in the application may be said to be one having, for the transmission of signals between peripheral devices, a single highway pair consisting of a single send highway to which the peripheral devices have sending access and a single receive highway to which the peripheral devices have receiving access. In such system, the number of peripheral devices is limited by the number of time slots made available by the multiplexing format. In the particular system shown by the application a maximum of 50 two-way communication peripheral devices can be serviced.

The general object of this invention is to provide a communication switching system comprised of a number of highway pairs, each generally similar to the single highway pair of the aforesaid patent application, whereby an increased number of peripheral devices may be included in the system.

Another object of this invention is to provide a communication switching system of the foregoing character whereby the size of the system, measured by peripheral device capacity, is flexible and may be readily varied incrementally by varying the number of highway pairs included in the system.

A still further object of the invention is to provide a multiple highway communication system which utilizes many of the same components as the single highway pair system of the aforesaid patent application and which system has or is capable of having the same desirable features as said single highway pair system, these features including a low per station cost for the system, ease in installing and maintaining the system, speedy operation in setting up and disconnecting communication paths and handling other services requests, and the ability to provide various different system functions, such as camp-on, call forwarding, call conferencing, call hold, etc. largely through programming of the processor memory and without the need for keys on the telephone instruments.

Other objects and advantages of the invention will be apparent from the drawings and from the following detailed description and claims.

SUMMARY OF THE INVENTION

This invention resides in a PABX communication system using time division multiplexing over multiple transmission highways for establishing two-way communication paths between a plurality of telephones, trunk line interfaces or similar two-way communication peripheral devices. Each broadly defined transmission highway is a highway pair made up of a send highway and a receive highway servicing an associated group of peripheral devices each having sending access to its send highway and receiving access to its receive highway for communication with the system. One end of each send highway and one end of each receive highway is connected to a processor implemented common control. The multiplexing format of all highways of the system is the same and consists of repetitive frames each having a fixed plurality of time slots most of which are "audio" time slots and a few of which are "command" time slots. Each peripheral device has sending access to a particular one of the audio time slots of its send highway and includes means enabling it to receive on any selected one or more of the audio time slots of its receive highway.

The switching required for establishing two-way communication paths is carried out in part in the peripheral devices and in part in the common control. The switching performed in the peripheral devices consists of conditioning, by way of command messages transmitted to it over the associated send highway in the command time slots, a peripheral device to receive on a particular audio time slot or slots of its receive highway. The part of the switching which occurs in the common control is performed by a plurality of highway switches, one for each highway pair, which under processor control route signals appearing in one audio time slot of one send highway to the corresponding audio time slot of the receive highway or highways associated with the peripheral device or devices intended to receive such signals.

The invention further resides in the common control including slot shifters associated with each highway pair for shifting a signal appearing in one audio time slot of one send highway to another audio time slot of that highway in the event the corresponding time slot of the receive highway to which the signal is to be forwarded is already in use. It further resides in the use of tone decoders, gating repeaters and dual tone multiple frequency (DTMF) generators for effecting either outpulsing from a peripheral device associated with a dial pulse trunk line or touch tone outputs from a peripheral device associated with a touch tone trunk line.

A further aspect of the invention resides in a supervisory tone generator in the common control which supplies supervisory tones to each of the highway switches whereby each highway switch may also be set to supply, under processor control, any selected one of the supervisory tones to any one of the audio time slots of the receive highway with which it is associated. Also, each peripheral device includes a means for varying its frame-by-frame transmission pattern in accordance with its state, and each highway pair includes a status reporter which inspects the transmission pattern from each audio time slot of its associated send highway and furnishes status information so obtained and concerning each peripheral device to the processor for use in establishing and disestablishing communication paths.

BRIEF DESCRIPTION OF THE DRAWINGS

FIG. 1 is a schematic block diagram showing broadly a complete communication system embodying this invention.

FIGS. 2a, 2b, 2c, 2d, 2e and 2f when arranged relative to one another as shown in FIG. 3, form a single diagram, hereinafter referred to as FIG. 2, showing in greater detail the communication system of FIG. 1.

FIG. 3 is a diagram illustrating the manner in which FIGS. 2a to 2f are arranged to form FIG. 2.

DETAILED DESCRIPTION OF THE PREFERRED EMBODIMENT

Figure 2A:
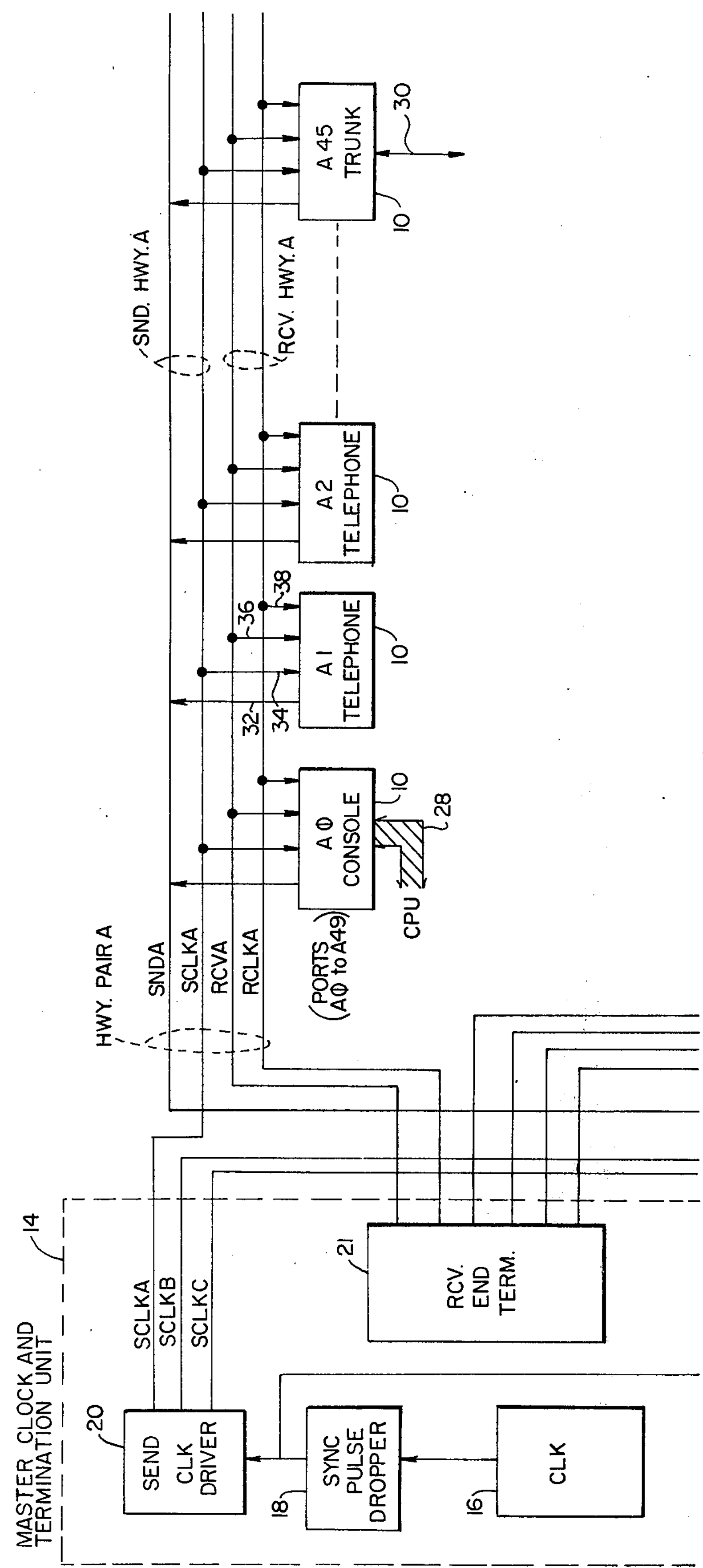

The general organization of a system embodying this invention is exemplified by the system illustrated broadly in FIG. 1. Referring to this figure, the illustrated system includes three highway pairs A, B and C each servicing up to forty-six two-way communication peripheral devices 10, 10, the devices of highway pair A being designated A0 to A45, those of highway pair B being designated B0 to B45 and those of highway pairs C being designated C0 to C45. The number of highway pairs in a given system may, however, vary without departing from the invention, it indeed being a feature of the invention that the size of the system may be readily varied by changing the number of highway pairs it contains. Also, the maximum number of peripheral devices which each highway pair can service may vary depending on the number of audio time slots provided in the multiplexing format, and not all possible peripheral devices need be installed.

Each highway pair consists of a send highway and a receive highway identified as shown in FIG. 1. Each peripheral device 10 of a particular highway pair is connected to its send highway for sending access to the system and is connected to its receive highway for receiving access to the system. One end of each send highway and one end of each receive highway is connected to a common control 12 and the opposite ends of each highway are connected to a master clock and termination unit 14. Signals on the send highways are transmitted inwardly toward the common control 12 and signals on the receive highways are transmitted outwardly from the common control, as indicated by the arrows in FIG. 1.

The master clock and termination unit 14 suitably terminates the adjacent ends of the send and receive highways and supplies an identical clock signal to all send highways to time divide the usage of the send highways into repetitive frames of time slots according to the multiplexing scheme used for transmission. In the common equipment 12, these clock signals are received, regenerated and supplied to the receive highways for similarly time dividing the usage of the receive highways.

Although a peripheral device sends on its send highway and receives on its receive highway, the signals which it receives do not necessarily originate on its send highway. For example, if device A1 wishes to send a message to device B2, the signals which device A1 injects on send highway A must be forwarded to receive highway B in order to reach device B2. As described in more detail hereinafter, an important function of the common equipment 12 is to achieve such forwarding of signals from the send highways to the receive highways.

Figure 2B:
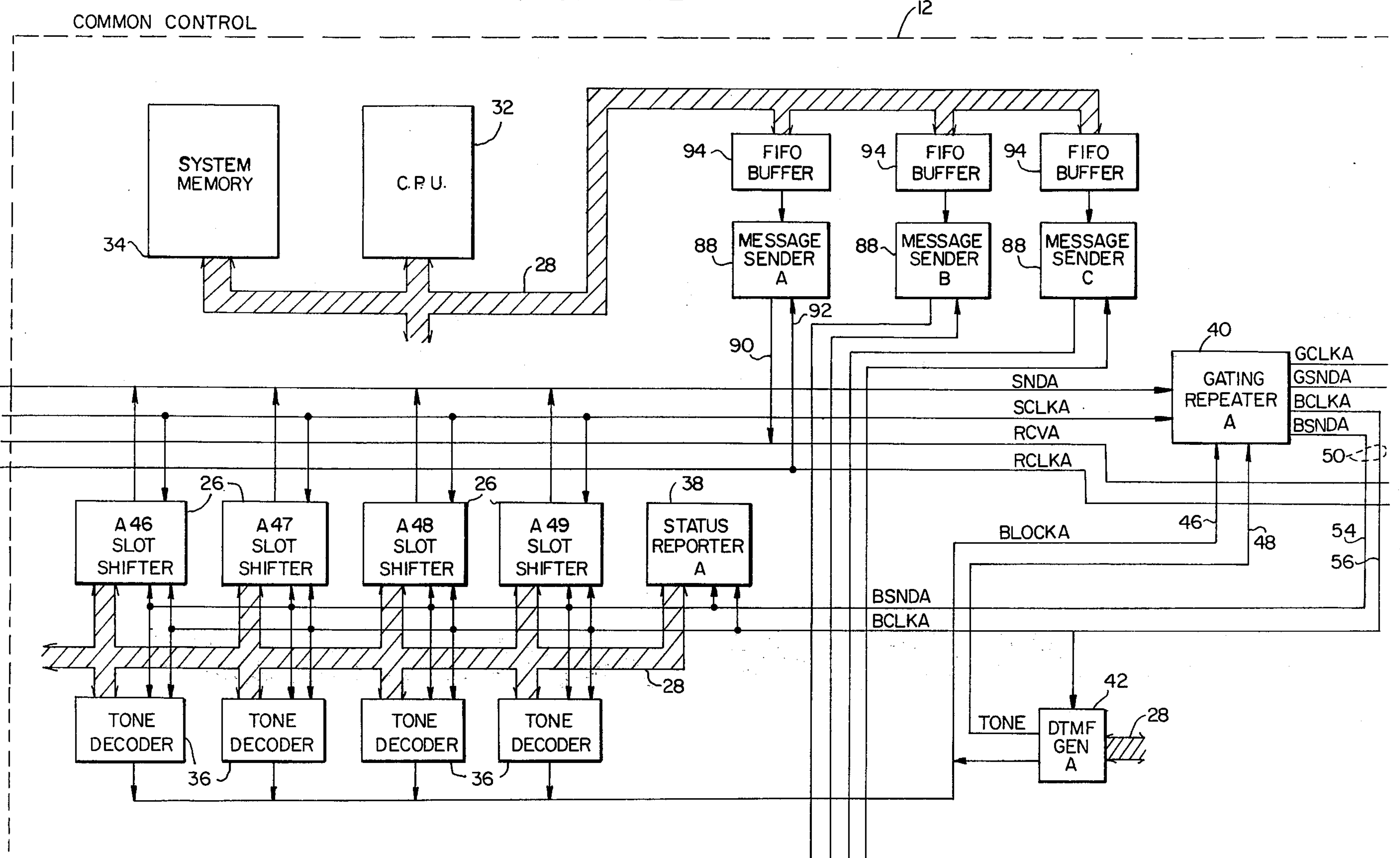
Figure 2C:
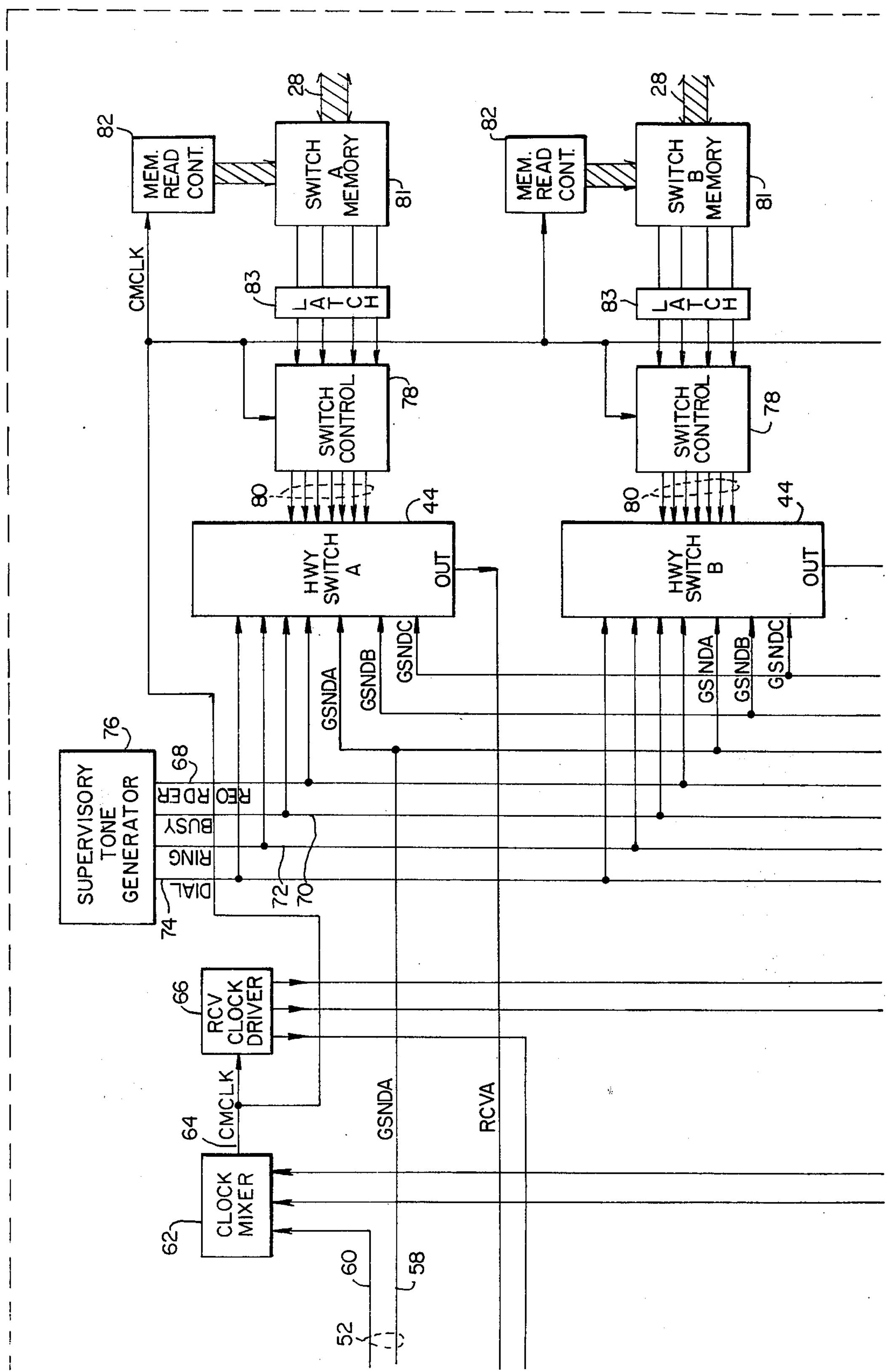
Figure 2D:
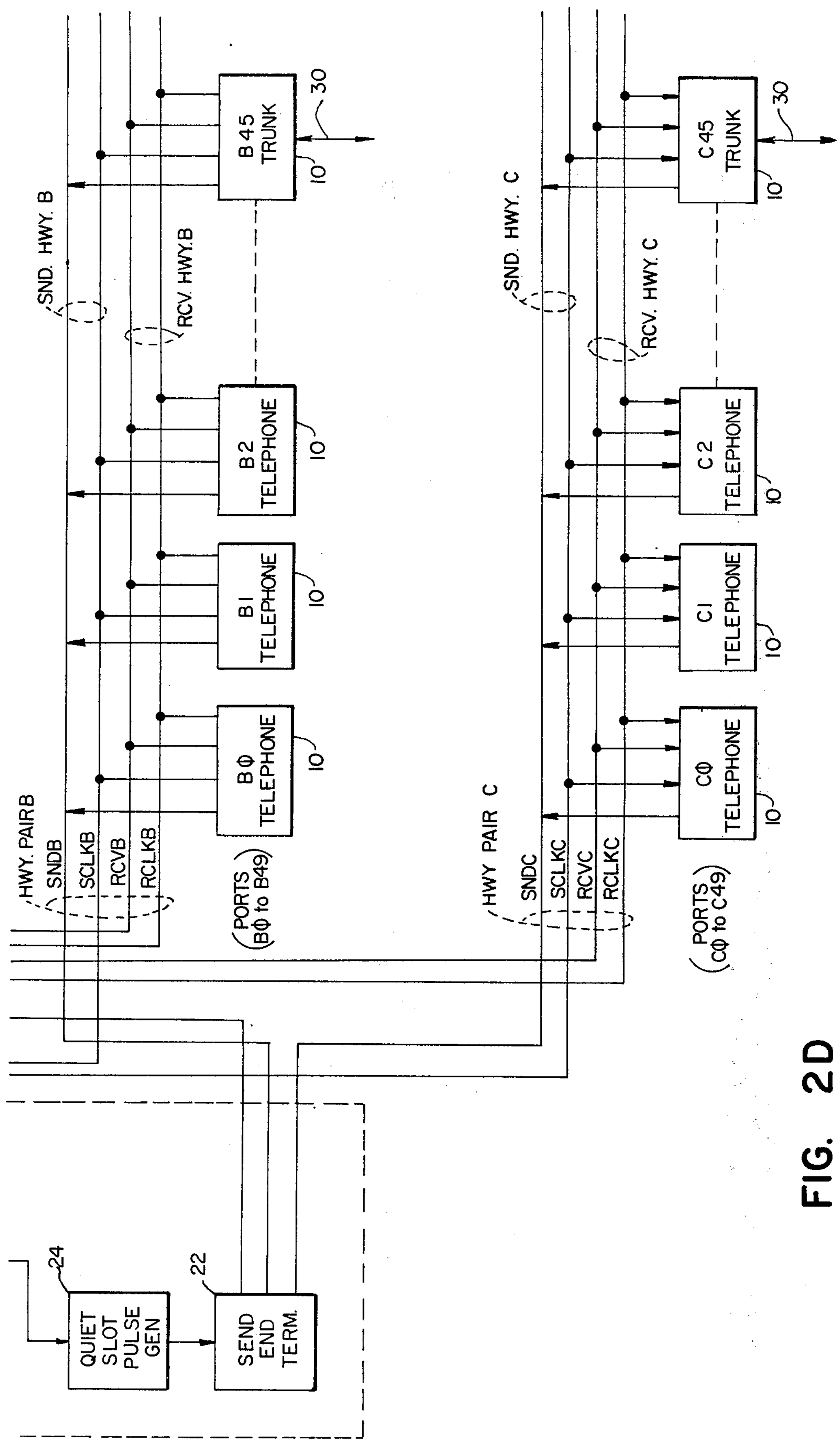
Figure 2E:
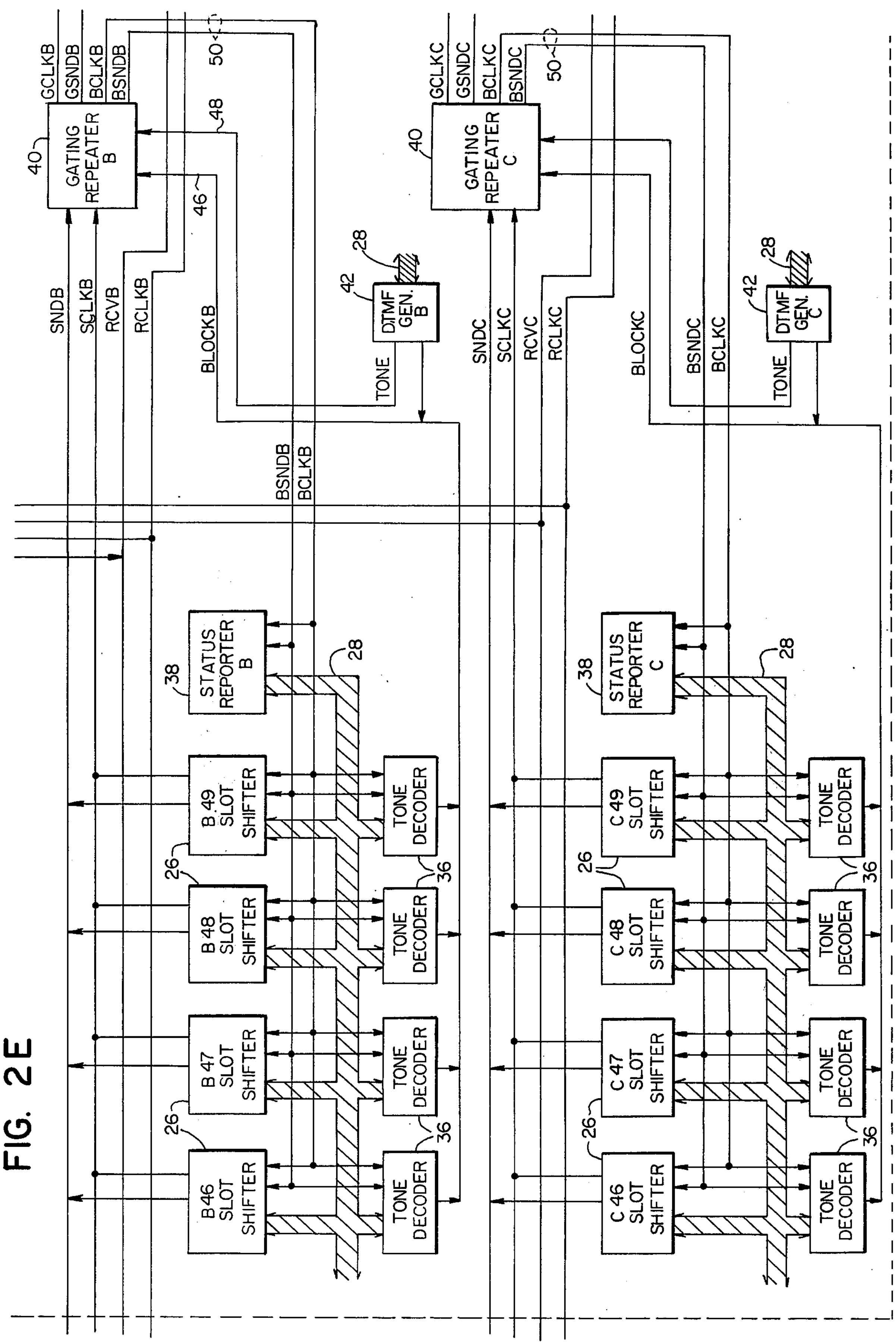
Figures 2F, 3:
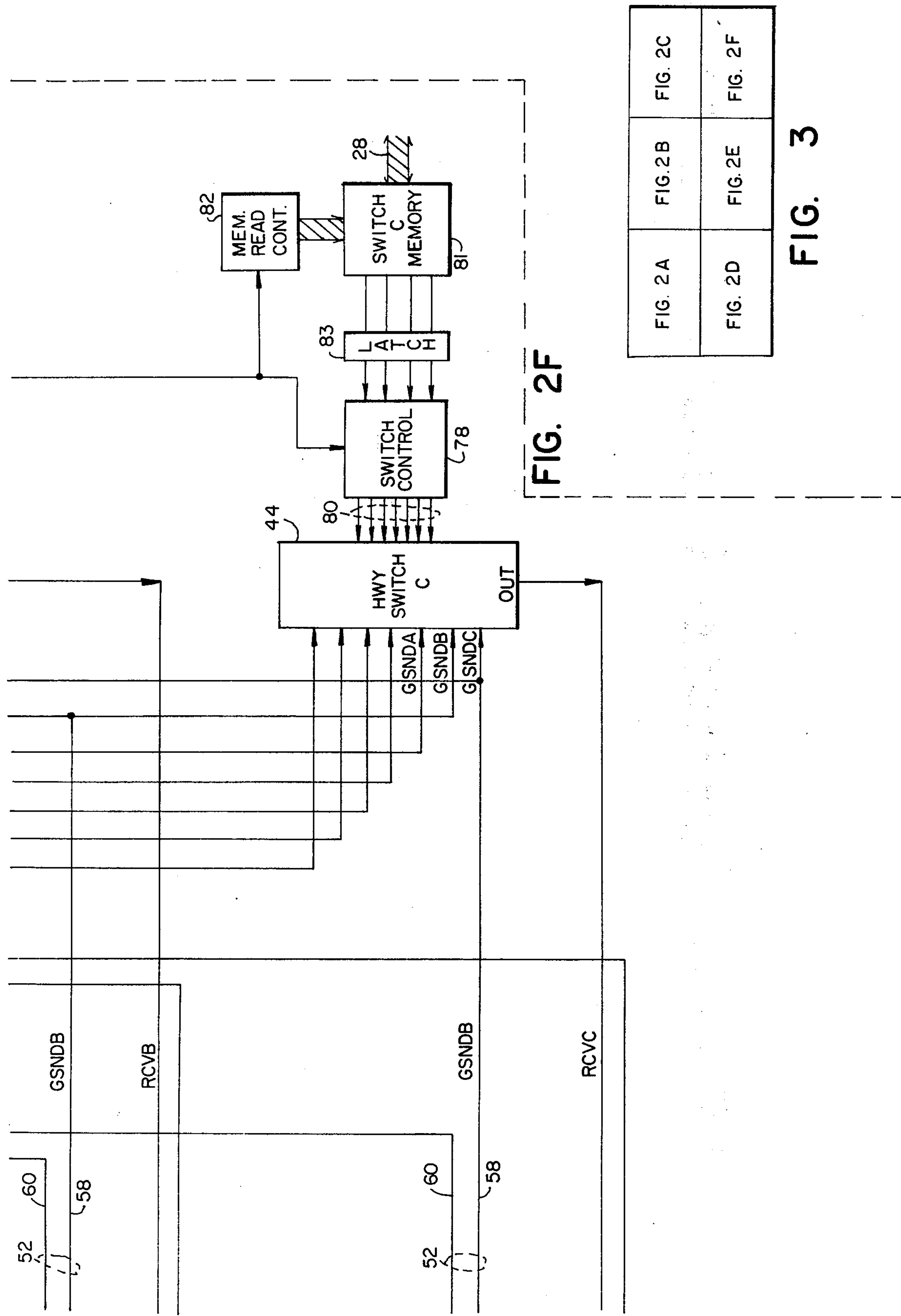

FIG. 2 shows in more detail the system of FIG. 1. Before considering this figure in depth, it should be noted that the illustrated system is an expanded version of the single highway pair system shown and described in the aforementioned patent application Ser. No. 665,551. In particular, the time division format, the nature of the individual send and receive highways, the method of signal injection and extraction to and from the highways, the construction of the peripheral devices (referred to as line appliques and trunk appliques in the previous application) and the construction and arrangement of many other parts of the system are similar to that of the disclosure of the aforementioned application, and reference may be had to said application for further understanding of these matters.

The time division format used in the system of FIG. 2 is identical with that of the aforementioned application and involves a fifty-six time slot commutation frame having a frame rate of 12.5KHz. Timing is provided by a clock generating pulses at a rate of 700KHz. Synchronism is achieved by dropping every fifty-sixth pulse from the stream of clock pulses to establish the commutation frame rate. The dropped pulse is regenerated in the peripheral devices and elsewhere locally as a sync pulse when needed. The fifty-six pulses of each frame divide time into fifty-six time slots for each frame. Four of these are "command" time slots used to transmit command messages to the peripheral devices, one is a "sync" time slot which is not used, and another is a "quiet" slot which carries an unmodulated signal. During dialing, for example, a subscriber hears nothing because his peripheral device is conditioned to receive on the quiet slot at that time. The remaining fifty time slots, 0, 1, 2, . . . 49, are "audio" time slots which are used for talking paths between the peripheral devices.

The command time slots convey digital information by way of pulses which may or may not be present. A pulse appearing in a command time slot represents a "logical 1" and the absence of a pulse represents a "logical 0". Each command message is made up of a sequence of logical 1's and 0's transmitted during a number of consecutive commutation frames. Audio or voice-band information is in turn carried by width modulated pulses in the audio time slots. When a particular audio time slot is not in use, no pulse appears in it as it is repeated in consecutive frames.

Referring to FIG. 2, each send highway is comprised of two transmission lines, one being a "send" line on which the audio and command message signals are transmitted and the other being a "clock" line used for timing the sending access of the associated peripheral devices to the send line. For the three illustrated highway pairs, the send lines are indicated at SNDA, SNDB and SNDC, the three clock lines are indicated at SCLKA, SCLKB and SCLKC. Similarly, each receive highway is comprised of two transmission lines, one being a "receive" line over which the audio and command message signals are transmitted and the other being a "clock" line for timing the receiving access of the associated peripheral devices to the receive lines. In the illustrated case, the three receive lines are designated RCVA, RCVB and RCVC and the three associated clock lines are designated RCLKA, RCLKB and RCLKC. Also, as explained in the aforementioned patent application, each line is actually a two conductor balanced line with all of the transmitted signals being balanced ones.

The master clock and termination unit 14 includes a master clock 16 which produces clock pulses at the desired 700KHz rate. These pulses are delivered to a sync pulse dropper circuit 18 which drops every fifty-sixth pulse in the stream of clock pulses from the clock 16 to signal the beginning and end of each commutation frame. The pulses from the pulse dropper 18 are in turn supplied to a send clock driver 20 which supplies three pulse trains, identical to that from the pulse dropper 18, to the three send clock lines, SCLKA, SCLKB and SCLKC. A receive end termination circuit 21 provides suitable terminations for the adjacent ends of the receive and receive clock lines of the three receive highways. Similarly, a sending end termination circuit 22 provides suitable termination for the adjacent ends of the send lines of the send highways. The circuit 22 also injects on each send line an unmodulated pulse in the quiet slot of each frame with such quiet slot pulse being produced by a quiet slot pulse generating circuit 24 having as an input the pulse train emanating from the sync pulse dropper 18.

Included in the mix of peripheral devices serviced by the system of FIG. 2, is a console including a telephone and also including a busy lamp field and other features not available at other peripheral devices servicing telephones or trunks. Two-way communication between the console and a central processor 32 in the common control, to convey data required by the special console features, is provided by a two-way data bus 28. With the exception of this console connection to the common control, all other peripheral devices communicate with the remainder of the system only through the send and receive highways. In a typical installation, most of these other peripheral devices are ones serving telephone instruments and others are ones serving as interface units with trunk lines such as indicated at 30, 30.

As exemplified by the peripheral device A1, each such device has one terminal 32 for sending access to its send line and another terminal 34 for deriving clock pulses from its send clock line for timing the sending access. Further, a terminal 36 provides receiving access for the peripheral device to its receive line with such receiving access being timed by clock signals supplied through another terminal 38 connected to the associated receive clock line.

The common control 12 is controlled by a stored program central processing unit 32 having an associated system memory 34 which stores the operating program for the processor and data needed for functioning of the system. For each highway pair, the illustrated common control includes four slot shifters 26, 26, four tone decoders 36, 36, a single status reporter 38, a gating repeater 40, a dual tone multiple frequency (DTMF) generator 42 and a highway switch 44. Each gating repeater 40 has as inputs thereto the send and send clock lines of its associated send highway. Other inputs are a BLOCK signal appearing on an input line 46 and pulses, modulated by touch tone signals, appearing on an input line 48 and produced by the associated DTMF generator 42. The outputs from each gating repeater 40 are two internal highways 50 and 52. The internal highway 50 is referred to as a buffered send highway consisting of a buffered send line 54 and a buffered clock line 56, the signals appearing on these lines being buffered versions of the signals received by the gating repeater from the associated input send and send clock lines. The internal highway 52 is referred to as a gated send highway and consists of a gated send line 58 and a gated clock line 60. The signals appearing on the gated send line 58 are a buffered version of the signals appearing on the associated input send line except that the repeater includes a gate between the input send line and the gated send line which gate in response to the appearance of BLOCK signals appearing on the line 46 in any given time slot inhibits or blocks transmission of signals to the gated send line in that time slot. When BLOCK signals do appear in a particular time slot, signals appearing on the associated tone line 48 may be injected through the gating repeater into the corresponding time slot of the gated send line. The gated clock line receives clock signals which are a buffered version of the signals appearing on the input send clock line. These clock signals are not gated or inhibited by the BLOCK signals appearing on the line 46 but do pass through the same type of circuitry as the send line signals so as to be subject to the same time delays, distortions, etc. as the send line signals.

To provide timing or clock signals for the receive highways and for various components of the common control, the common control also includes a clock mixer 62 having as inputs thereto all of the gated clock lines 60. This mixer, from the input clock signals, produces an output clock signal, referred to as "common clock", on the line 64. This common clock signal is synthesized or regenerated from the several inputs to the clock mixer so as to be the "best average" of the input signals and of essentially the same nature as any one of them. The common clock signal on the line 64 is in turn supplied to a receive clock driver 66 which generates three identically corresponding clock signals delivered to the three receive clock lines.

Each highway switch has an output terminal connected to the receive line (RCVA, RCVB or RCVC) of its associated receive highway. It further has three input terminals connected respectively to the three gated send lines 58, 58. Four other input terminals of each highway switch are also individually connected to four supervisory tone lines 68, 70, 72 and 74 on which appear, in each time slot, pulses width modulated by "reorder", "busy", "ring" and "dial" tones and which are provided by a supervisory tone generator 76. During any time slot each highway switch may be set to connect its output terminal to any selected one or none of its input terminals. Accordingly, during any time slot, the switch may be set to pass ot its output terminal and to the associated receive line the signal then appearing on any one of the gated send lines 58, 58, the signal appearing on any one of the supervisory tone lines 68, 70, 72 and 74 or no signal. The setting of the switch points of each highway switch during each time slot is controlled by a switch control unit 78, one for each switch, which supplies switch point setting signals to the switch through a set of terminals 80. The switch control unit 78 is responsive to a set of instructions, each identifying the switch setting for one time slot, stored sequentially in an associated fifty-one word memory 81. The fifty-one words or instructions stored in the memory 81 specify the switch point settings during each of the fifty audio time slots and the quiet time slot, and the contents of the memory are updated as required by the CPU over the data bus 28.

Under control of a memory read control unit 82 and clock signals supplied by the common clock line 64 during each time slot, a switch setting instruction is read from each memory 81 during each audio time slot and each quiet slot and is supplied to an associated latch 83 from which it is in turn supplied to the switch control unit 78 for conversion to proper switch setting signals on the lines 80. A highway switch does not forward any signals during the command time slots of each frame, and therefore during this portion of each commutation frame, no instructions need be drawn from the associated memory 81. The switch memory includes a separate buffer register into which the CPU, over the data bus 28, may enter a time slot identifying number and a switch point instruction word. The time interval occupied by the command time slots is, therefore, utilized for inspection of the buffer register and for memory update if the buffer register is found to hold new information.

Every two-way peripheral device 10 is assigned to a particular highway pair and is also assigned a particular audio time slot. The assigned highway/time-slot combination is therefore unique to that peripheral device. For example, in FIG. 2 the highway assignment of each peripheral device is identified by the letters A, B and C and its time slot assignment is identified by the numbers 0 to 45 so that, for example, the peripheral device identified as "B1" is assigned to highway B and audio time slot 1.

All transmission from a two-way peripheral device is on the send highway of its assigned highway pair, and during its assigned time slot. When there is no transmission from a particular two-way peripheral device there is no signal in the time slot assigned to that device on its send highway. Further, all reception by a peripheral device is from the receive highway of its assigned pair. The device receives all command messages which appear on that receive highway (and which are transmitted by signals appearing in the command time slots) but disregards messages not specifically addressed to it. Each peripheral device has a means enabling it to selectively receive during the fifty audio time slots and the quiet slot, with the particular slots on which it is to receive being specified by the command messages addressed to it. It may, therefore, be directed by a command message to receive (from the receive highway of its assigned highway pair) during any of the fifty audio time slots and quiet slots in each commutation frame, or during none.

A one-way talking path from one peripheral device to another, for example from port A1 to port B1, is established by two commands from the processor 32. First, the highway switch 44 which serves receive highway B is instructed by the CPU to close the switch point to A1's send highway (actually gated send highway A) during device A1's assigned time slot. That is, highway switch B is instructed, during time slot 1 to close the switch point connecting gated send line A to receive line B so that the signal appearing in time slot 1 of send line A is forwarded to time slot 1 of receive line B. Secondly, device B1 is instructed by the CPU by way of command messages sent on receive highway B to receive during port A's assigned time slot, that is time slot 1. It should be noted here that the signal which is transmitted by device A1 may be forwarded by the highway switches onto more than one receive highway, as may be necessary when setting up a conference call between a number of peripheral devices. Also to enable the setting up of a conference call, it should be noted that any one peripheral device may be directed to receive (from its receive highway) on more than one audio time slot and more than one peripheral device may be directed to receive port A1's signal from any receive highway on which it appears.

A supervisory tone is sent to a peripheral device by instructing it to receive during a selected audio time slot and by instructing the appropriate highway switch to forward to the associated receive line the signal from the desired tone line, 68, 70, 72 and 74 during that time slot.

Command messages are injected into the receive highways by message senders 88, 88 one of which is associated with each receive highway. Each message sender has a terminal 90 connected to the receive line of its receive highway for the injection of command messages onto said line and also has a terminal 92 connected to the receive clock line of its highway for the extraction of clock signals from such line to time the signal injection.

All command messages have the same format with each consisting of seventeen words with four bits in each word. The transmission of a single command message requires seventeen consecutive commutation frames. One word of the message is sent during each frame with each of the four bits of such word being represented by the presence or absence of a single signal pulse in one of the four command slots. The first two words of each command message are sync words each consisting of four 1's. These words mark the start of a command message. The next two words are address words specifying the peripheral device to which the command message is addressed. The remaining thirteen words of each command message, containing a total of fifty-two bits are information words. In a command message addressed to a two-way peripheral device the first fifty-one of these bits constitute a listening order. Each of the first fifty bits of the listening order is an instruction (to the addressed device) to receive or not to receive during the corresponding one of the fifty audio time slots in the commutation frame). The last bit in the listening order is an instruction to receive or not to receive during the quiet time slot. The remaining bit of the fifty-two bits contained in the information word is called a ring bit which controls the ringer on the telephone of a telephone equipped peripheral device and controls the seizure of a trunk line connected to a peripheral device servicing such line. Each peripheral device includes a local memory for storing the listening order received by it with such register being updated when necessary by new command messages formulated by the CPU and injected on its receive line through the corresponding message sender.

Each message sender has a memory in which it stores nine hundred sixty words of four bits each. These are address words and information words of sixty-four messages. The sync words which are always the same, are not stored; and, instead, they are generated in the message sender whenever they are needed. In normal operation, the message sender cycles through its store of messages, sending them out in sequence. Since each commutation frame is 80μs long and a complete set of seventeen words is sent in 1.36ms. and a full set of sixty-four messages can be sent in less than 100ms. The CPU may, at any time, load the fifteen address and information words of a new command message into a FIFO buffer register 94 associated with the involved message sender. At the conclusion of each outgoing command message, the message sender inspects its buffer register 94 to see whether or not a new command message has been entered there by the CPU. If there is a new command message, the message sender transmits that message, simultaneously updating its memory. After sending the new message, the message sender returns to its normal sequencing unless, in the meantime, another new message has been entered in its FIFO buffer.

A telephone connected to a peripheral device may be either off-hook or on-hook. Similarly, a trunk connected to a peripheral device may be either seized or not seized by the exchange at the far end of the trunk. In addition, a peripheral device may be receiving during one or more audio or quiet time slots or it may not be receiving during any such time slots. The state of a peripheral device based on these considerations is as follows:

| | | |
|---|---|---|
| Off-Hook or seized | Receiving | Active |
| Off-Hook or seized | Not-Receiving | Attention |
| On-Hook or Not-seized | Receiving | Attention |
| On-Hook or Not-seized | Not-Receiving | Idle |

An active peripheral device transmits during every commutation frame on the send highway of its assigned highway pair in its assigned time slot. An idle device does not transmit in any time slot. A device in the attention status transmits on the send highway of its assigned highway pair and in its assigned time slot during every other commutation frame. The status reporter 38 associated with each highway pair determines the status of each peripheral device of that highway pair and supplies the determined information to the CPU 32, on request for use by the CPU in establishing and disestablishing calls. In particular, each status reporter monitors its associated send line (actually buffered send line) to detect the presence or absence of signal pulses in each of the fifty audio time slots of each commutation frame. It contains two fifty bit shift registers and a counter. During each audio time slot a 1 is loaded into the first shift register if a pulse is present, a 0 if there is no pulse. Simultaneously, the second shift register is loaded with the output of the first. During each audio time slot, the output of the first shift register is a 1 if there was a pulse in that time slot during the preceding commutation frame, a 0 if there was no pulse. The output of the second shift register displays the same information with respect to the next earlier commutation frame. The counter counts the time slots and thereby displays the identifying number of each time slot. If a peripheral device is in the idle state, the shift register outputs show two 0's when the counter holds the identifying number of the time slot assigned to that device. If the device is active, the shift register outputs show two 1's when the counter holds the identifying number of the time slot assigned to that device, and if the device is in attention status, the shift register outputs are a single 0 and a single 1.

Each status reporter also contains a FIFO register. On receipt of a request, which may be made at any time from the central processor, the status reporter clears the FIFO register. During the next commutation frame, it loads the register with a time slot identifying number and a status identifier (active or attention) for every non-idle device. At the same time it loads a 1, for every non-idle device, into a third fifty bit shift register which is cleared when the buffer register is cleared. During subsequent commutation frames, data for a non-idle device are loaded into the buffer register and a 1 is loaded into the third shift register only if a third register holds a 0 for that device. Accordingly, the buffer register never holds more than one entry for any device.

The central processor, having requested information from a status reporter, may return at a later time to inspect the FIFO register. If the register holds information (the identifying number and status of at least one non-idle device) the central processor may, at its own convenience, read that information out of the register. As soon as information about one device is read out of the buffer register by the CPU, the register offers information about another device if it holds such information or indicates that it is empty. The central processor at its own convenience alternates register inspections and information read outs until it determines that a buffer register holds no more information.

Consider the situation which arises when the CPU has already established a one-way talking-path from device N to device M and then attempts to establish a second one-way talking path from device P to device Q. If device N and device P have different assigned time slots, no problem arises and the CPU can establish the second talking path from device P to device Q without difficulty. If device M and device Q have different assigned highway pairs, no problem arises and the CPU as before can establish the second talking path without difficulty. If, however, device N and device P have the same assigned time slot and device M and device Q have the same assigned highway pair, a complication arises. Device P's signal arrives at the highway switch (on the send highway of device P's assigned highway pair) during the same time slot as device N's signal (although, necessarily, on a different send highway). The highway switch is, therefore, unable to forward device P's signal on the receive highway accessed by (both) device M and device Q because it is already forwarding device M's signal (in the time-slot during which device P's signal appears) on that receive highway.

The problem is resolved by the slot shifters 26, 26. Each slot shifter may receive, from the send highway of its associated highway pair, during any selected communication slot. It demodulates the received signal and retransmits the recovered voice band information, as modulation on a width-modulated pulse, on the same send highway during its own assigned audio time slot which is not used by any two-way port or by any other slot shifter associated with the same highway pair. In the example described above, device P's signal is received by one of the slot shifters assigned to device P's highway pair. Both device P's signal and the slot shifter's transmitted signal arrive at the highway switch. Device P's signal is disregarded by the highway switch and, instead, the slot shifter's transmitted signal (which carries the same voice band information) is forwarded on the receive highway accessed by device M and device Q. Device Q is then instructed to receive during the time slot on which the slot shifter transmits. The talking path, as finally established, is from device P to the slot shifter temporarily assigned to device P without involving the highway switch, then from the slot shifter through the highway switch to device Q. The slot shifter is assigned to device P by the CPU, which instructs it to receive during the time slot on which device P transmits. A slot shifter is instructed to receive during a specified time slot by the CPU directly, rather than by way of a command message. The slot shifter, therefore, need not receive command messages and has no capability for reception during the command slots.

Dialing from peripheral devices is by a touch dial pad in each telephone equipped device for generating two-tone coded dial entries. These entries are transmitted to the common control in the audio time slot of the send line assigned to the dialing device. In the common control these two-tone dial entries are handled by the tone decoders 36, 36. Like a slot shifter, a tone decoder is temporarily assigned to a specified port by a direct command from the CPU, rather than by a command message on a receive highway, which instructs it to receive during the time slot in which that port transmits. Like a slot shifter, a tone decoder receives from the send highway (actually buffered send highway) with which it is associated so that the path from a device to its temporarily assigned tone decoder does not involve the highway switch in any way. In a tone decoder received two-tone dial entry signals from a calling device are decoded and made available to the CPU, on request, on a character-by-character basis. Rotary-dial signals from a foreign exchange and arriving on a trunk line are converted in the associated peripheral device to two-tone signals for presentation to a tone decoder.

When a talking path is established from one peripheral device to a device servicing a trunk line, the tone decoder assigned to the calling device remains assigned until out-dialing is completed. The out-dialing entry is decoded and made available to the CPU, on a character-by-character basis, where it is checked for conformance with trunk use restrictions and class-of-service restructions. If the trunk will accept two-tone out-dialing, nothing more is required for subscriber out-dialing. If, however, the trunk accepts only rotary dial signals, these are generated as required by an out-pulsing relay at the trunk port. The out-pulsing relay is controlled, through the tone decoder, by the CPU. In particular out-dialing signals are decoded, by the tone decoder, and made available to the CPU on a character-by-character basis as described above. The decoded out-dialing characters are returned to the tone decoder by the CPU, on a character-by-character basis, at a slower rate. As each character is received by the decoder, it is converted into a train of blocking pulses. During each blocking pulse (which lasts for about 0.06 sec.), the decoder generates a series of BLOCK signals (one in each commutation frame) in the time slot to which it is assigned. Each BLOCK signal is passed to the associated gating repeater 40 in the send highway, and inhibits transmission of the normal signal in the gated time slot. At the trunk port, the absence of incoming signals (during each blocking pulse) actuates the out-pulsing relay so that simulated rotary dial signals are presented to the trunk for out-dialing.

The dual tone multiple frequency generators 42, 42 are used by the CPU to forward two-tone dial entries to a touch tone trunk line in those cases where out-dialing information is originated by the CPU rather than by a calling peripheral device. During such an out-dialing procedure, the CPU instructs the appropriate DTMF generator 42 to issue BLOCK signals in one audio time slot thereby causing the associated gating repeater 40 to inhibit transmission onto the associated gated send highway, thereby clearing such time slot, on the gated send highway of any signals from the related send highway. Then while the time slot is so cleared the DTMF, under processor control, supplies pulses width modulated by two-tone dial entries on the line 48 which are injected into the otherwise cleared time slot and are forwarded through a highway switch 44 to the trunk line peripheral device.

We claim:

1. A communication switching system for establishing two-way communication paths between a plurality of peripheral devices, said switching system comprising: a common control, a plurality of highway pairs each having a send highway and a receive highway, each of said send highways having one end connected to said common control and each of said receive highways having one end connected to said common control, means time dividing the usage of said send highways and said receive highways into repetitive frames each having a plurality of time slots including a plurality of audio time slots, a plurality of peripheral devices associated with each of said highway pairs, means in each peripheral device providing it with sending access to one of the audio time slots of its send highway, receiving control means in each peripheral device conditionally enabling it to receive from at least one selected one of the audio time slots of its receive highway, and means in said common control for forwarding the signal appearing in each audio time slot of each of said send highways to the corresponding audio time slot of any selected one or more of said receive highways, each of said second highways including a communication send line and a send clock line, each of said receive highways including a communication receive line and a receive clock line, each of said peripheral devices being connected to its communication send line for sending access to its send highway and being connected to its communication receive line for receiving access to its receive highway, said means time dividing the usage of said send highways and said receive highways into repetitive frames comprising means for injecting clock signals onto said send clock lines and said receive clock lines, each of said peripheral devices having a means connected to said send clock line for timing its sending access to its communication send line, and each of said peripheral devices having a means connected to its said receive clock line for timing its receiving access to its communication receive line, said means for injecting clock signals onto said send clock lines and said receive clock lines comprising means for injecting send clock signals onto said send clock lines at the ends thereof remote from said common control, means in said common control for extracting the set of send clock signals from said send clock lines and for mixing said set of send clock signals to produce a single common clock signal, and a receive clock driver driven by said common clock signal for producing a set of receive clock signals injected respectively onto said receive clock lines at the ends thereof adjacent said common control.

2. A communication switching system for establishing two-way communication paths between a plurality of peripheral devices, said switching system comprising: a common control, a plurality of highway pairs each having a send highway and a receive highway, each of said send highways having one end connected to said common control and each of said receive highways having one end connected to said common control, means time dividing the usage of said send highways and said receive highways into repetitive frames each having a plurality of time slots including a plurality of audio time slots, a plurality of peripheral devices associated with each of said highway pairs, means in each peripheral device providing it with sending access to one of the audio time slots of its send highway, receiving control means in each peripheral device conditionally enabling it to receive from at least one selected one of the audio time slots of its receive highway, and means in said common control for forwarding the signal appearing in each audio time slot of each of said send highways to the corresponding audio time slot of any selected one or more of said receive highways, said common control having for each of said send highways a gating means in advance of said forwarding means operable in response to a BLOCK signal associated with a given selected time slot to inhibit transmission of signals appearing in such time slot to said forwarding means.

3. A communication switching system as defined in claim 2 further characterized by means for selectively providing each of said gating means a sequence of BLOCK signals associated with a given time slot to cause the transmission to said forwarding means in said given time slot a sequence of bursts of signals spaced by absences of signals, and means in at least one of said peripheral devices responsive to such spaced bursts of signals for generating out-pulse dialing signals for transmission to an associated trunk line.

4. A communication switching system as defined in claim 2 further characterized by means for selectively providing each of said gating means a sequence of BLOCK signals associated with a given time slot to inhibit the transmission from the associated send highway to said forwarding means in said given time slot during a given time interval, means operable during said interval for transmitting dial tones to said forwarding means in said given time slot, and means in at least one of said peripheral devices responsive to said dial tones for transmitting said dial tones to an associated trunk line.

5. A communication switching system as defined in claim 2 further characterized by said plurality of time slots of each of said repetitive frames also including a plurality of command time slots, a message sender means associated with each of said highway pairs for injecting command messages into said command time slots of its receive highway, means in each of said peripheral devices for receiving command messages transmitted on its associated receive highway and responsive to such command messages for controlling on which of the audio time slots of its receive highway it is to receive, a central processor for formulating the command messages injected onto said receive highways by said message senders and for providing instructions for controlling said forwarding means, at least one tone decoder associated with each of said highway pairs, means in each of said peripheral devices for generating dialing signals injected into its associated audio time slot of said send highway, means operable to temporarily assign said tone decoder to a peripheral device of the same highway pair as said tone decoder during the times said peripheral device injects dialing signals into its audio time slot of its send highway, said tone decoder including means for producing a BLOCK signal associated with the time slot to which said tone decoder is temporarily assigned for transmission to the associated one of said gating means to inhibit transmission of the signals appearing in said audio time slot to said forwarding means, and said tone decoder including means for receiving the dialing signals appearing in the audio time slot to which it is temporarily assigned and for supplying dialing information derived from said dialing signals to said central processor.

6. A communication switching system for establishing two-way communication paths between a plurality of peripheral devices, said switching system comprising: a common control, a plurality of highway pairs each having a send highway and a receive highway, each of said send highways having one end connected to said common control and each of said receive highways having one end connected to said common control, means time dividing the usage of said send highways and said receive highways into repetitive frames each having a plurality of time slots including a plurality of audio time slots, a plurality of peripheral devices associated with each of said highway pairs, means in each peripheral device providing it with sending access to one of the audio time slots of its send highway, receiving control means in each peripheral device conditionally enabling it to receive from at least one selected one of the audio time slots of its receive highway, means in said common control for forwarding the signal appearing in each audio time slot of each of said send highways to the corresponding audio time slot of any selected one or more of said receive highways, said plurality of time slots of each of said repetitive frames also including a plurality of command time slots, a message sender means associated with each of said highway pairs for injecting command messages into said common time slots of its receive highways, means in each of said peripheral devices for receiving command messages transmitted on its associated receive highway and responsive to such command messages for controlling on which of the audio time slots of its receive highway it is to receive, a central processor for formulating the command messages injected onto said receive highways by said message senders and for providing instructions for controlling said forwarding means, each of said peripheral devices having a number of different states, means in each of said peripheral devices for varying its frame-by-frame pattern of the sending of signals in its associated time slot of its send highway in accordance with its state, and a status reporter associated with each of said send highways, each of said status reporters having means for determining the current status of each peripheral device connected to its send highway by inspecting the frame-by-fram transmission pattern of each audio time slot of such highway for use by said central processor in formulating said command messages.

7. A communication switching system for establishing two-way communication paths between a plurality of peripheral devices, said switching system comprising: a common control, a plurality of highway pairs each having a send highway and a receive highway, each of said send highways having one end connected to said common control and each of said receive highways having one end connected to said common control, means time dividing the usage of said send highways and said receive highways into repetitive frames each having a plurality of time slots including a plurality of audio time slots, a plurality of peripheral devices associated with each of said highway pairs, means in each peripheral device providing it with sending access to one of the audio time slots of its send highway, receiving control means in each peripheral device conditionally enabling it to receive from at least one selected one of the audio time slots of its receive highway, means in said common control for forwarding the signal appearing in each audio time slot of each of said send highways to the corresponding audio time slot of any selected one or more of said receive highways, said common control having for each of said send highways a gating means in advance of said forwarding means, said gating means including means responsive to a BLOCK signal associated with a given selected time slot to inhibit transmission of signals appearing in such time slot to said forwarding means, at least one tone decoder associated with each of said highway pairs, means in each of said peripheral devices for generating dialing signals injected into its associated audio time slot of its associated send highway, means operable to temporarily assign a tone decoder to a peripheral device of the same highway pair as the tone decoder during the times such peripheral device injects dialing signals into its audio time slot of its send highway, said tone decoder including means for producing a BLOCK signal associated with the time slot to which it is temporarily assigned for transmission to the associated one of said gating means to inhibit transmission of the signals appearing in said audio time slot to said forwarding means, said tone decoder including means for receiving dialing signals appearing in the audio time slot to which it is assigned, each of said highway pairs having associated with it at least one slot shifter, means in each of said slot shifters providing it with sending access to one of the audio time slots of its send highway, means in each slot shifter enabling it to be selectively assigned to receive from any one of other auido time slots of its send highway and for forwarding the signal which it so receives to the audio time slot to which it is assigned for sending, and means for buffering the signals appearing in the audio time slots of each send highway and for supplying such buffered signals to all of the tone decoders and slot shifters associated with such highway as the input send highway signals thereto.

8. A communication switching system for establishing two-way communication paths between a plurality of peripheral devices, said switching system comprising: a plurality of highway pairs each including a communication send highway and a communication receive highway, means time dividing the usage of said communication send highways and said communication receive highway of said highway pairs into identical repetitive frames each having a plurality of time slots including a group of audio time slots, said time dividing means including a single master clock servicing all of said highway pairs so that the repetitive frames of time slots for each of said send highways are identical to and in phase with those of the other of said send highways and so that the repetitive frames of time slots for each of said receive highways are identical to and in phase with those of the other of said receive highways, a plurality of peripheral devices associated with each of said highway pairs, means in each peripheral device providing it sending access to one of the audio time slots of its send highway, receiving control means in each peripheral device conditionally enabling it to receive from at least one selected one of the audio time slots of its receive highway, a switch associated with each of said highway pairs of said switches having an output terminal connected to said receive highway of its highway pair and also having a plurality of input terminals, means connecting all of said send highways individually to corresponding ones of said input terminals of each of said switches whereby each of said switches receives the signals appearing on all of said send highways, and switch control means for controlling each of said switches whereby during each of said time slots either a selected one or none of its said input terminals is connected to its said output terminal.

9. A communication switching system as defined in claim 8 further characterized by said plurality of time slots of each of said frames also including a group of command time slots, means in each of said peripheral devices causing it to continuously receive the signals transmitted in said command time slots of its said receive highway, a message sender means associated with each of said highway pairs for injecting command messages into said command time slots of its receive highway each of which messages is addressed to a selected one of said peripheral devices associated with said receive highways and instructs such selected peripheral device on which of said audio time slots of said receive highway to receive, and said receiving control means of each of said peripheral devices including means responsive to the command messages addressed to it to cause said peripheral device to receive on the audio time slot of its receive highway as instructed by said command messages.

10. A communication switching system for establishing two-way communication paths between a plurality of peripheral devices, said switching system comprising: a plurality of highway pairs each including a communication send highway and a communication receive highway, means time dividing the usage of said communication send highways and said communication receive highway of said highway pairs into identical repetitive frames each having a plurality of time slots including a group of audio time slots, a plurality of peripheral devices associated with each of said highway pairs, means in each peripheral device providing it sending access to one of the audio time slots of its send highway, receiving control means in each peripheral device conditionally enabling it to receive from at least one selected one of the audio time slots of its receive highway, a switch associated with each of said highway pairs each of said switches having an output terminal connected to said receive highway of its highway pair and also having a plurality of input terminals, means connecting all of said send highways individually to corresponding ones of said input terminals of each of said switches whereby each of said switches receives the signals appearing on all of said send highways, switch control means for controlling each of said switches whereby during each of said time slots either a selected one or none of its said input terminals is connected to its said output terminal, a means providing a plurality of supervisory tone signals on a corresponding plurality of supervisory tone lines, and means connecting all of said supervisory tone lines individually to corresponding ones of said input terminals of each of said switches whereby each of said switches also receives all of said supervisory tone signals so that under control of said switch control means each of said switches may be set during each of said time slots to supply to its said output terminal either the signal then appearing on any selected one of said send highways, the signal appearing on any selected one of said supervisory tone lines, or no signal.

* * * * *